(12) United States Patent
Browne et al.

(10) Patent No.: US 8,261,892 B2
(45) Date of Patent: Sep. 11, 2012

(54) CUSTOMIZABLE STRUT ASSEMBLIES AND ARTICLES THAT EMPLOY THE SAME

(75) Inventors: Alan L. Browne, Grosse Pointe, MI (US); Nancy L. Johnson, Northville, MI (US); Nilesh D. Mankame, Sterling Heights, MI (US); John C. Ulicny, Oxford, MI (US); Gary L. Jones, Farmington Hills, MI (US); James C. O'Kane, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 139 days.

(21) Appl. No.: 11/077,496

(22) Filed: Mar. 10, 2005

(65) Prior Publication Data

US 2005/0199455 A1    Sep. 15, 2005

Related U.S. Application Data

(60) Provisional application No. 60/552,791, filed on Mar. 12, 2004.

(51) Int. Cl.
*F16F 9/32* (2006.01)
(52) U.S. Cl. .................................. 188/266.7; 188/266.1
(58) Field of Classification Search ............... 188/266.7, 188/266.1
See application file for complete search history.

(56) References Cited

U.S. PATENT DOCUMENTS

| | | | |
|---|---|---|---|
| 2,811,136 A | 10/1957 | Westcott, Jr. et al. | 91/44 |
| 2,856,200 A | 10/1958 | Conflitti | 280/5.513 |
| 2,973,969 A | 3/1961 | Thall | 280/5.517 |
| 3,695,144 A | 10/1972 | Goiffon et al. | 91/41 |
| 4,027,479 A * | 6/1977 | Cory | 60/527 |
| 4,351,515 A | 9/1982 | Yoshida | 267/225 |
| 4,655,629 A | 4/1987 | Flaherty | 403/291 |
| 4,773,680 A | 9/1988 | Krumme | 285/381.2 |
| 4,828,237 A | 5/1989 | Neff | 267/221 |
| 5,018,606 A | 5/1991 | Carlson | 188/267.1 |
| 5,070,697 A * | 12/1991 | Van Zeggeren | 60/527 |
| 5,095,595 A | 3/1992 | Stella et al. | 24/603 |
| 5,277,281 A | 1/1994 | Carlson et al. | 188/267 |
| 5,396,769 A | 3/1995 | Brudnicki | 60/528 |
| 5,398,916 A * | 3/1995 | Kramer et al. | 267/70 |
| 5,468,042 A | 11/1995 | Heinrichs et al. | 296/246.4 |
| 5,492,312 A | 2/1996 | Carlson | 267/140.14 |
| 5,592,780 A | 1/1997 | Checkovich | 49/386 |
| 5,657,969 A | 8/1997 | Bivens | 267/64.12 |
| 5,687,958 A * | 11/1997 | Renz et al. | 267/136 |
| 5,727,391 A * | 3/1998 | Hayward et al. | 60/528 |
| 5,741,007 A | 4/1998 | Witt | 267/64.12 |
| 5,839,719 A | 11/1998 | Hosan et al. | 267/64.12 |

(Continued)

FOREIGN PATENT DOCUMENTS

JP    63-50678    3/1988

(Continued)

*Primary Examiner* — Robert A Siconolfi
*Assistant Examiner* — James Hsiao

(57) ABSTRACT

Disclosed herein is a strut assembly 10 comprising a piston 3 in slideable communication with the housing 2; an actuator 16 in operative communication with the piston 3, wherein the actuator 16 comprises a shape memory material and is adapted to control the displacement of the piston. Disclosed herein too is a method of operating a strut assembly 10 comprising displacing a suspended body 60 in operative communication with a piston; and activating an actuator 16 in operative communication with the piston, wherein the actuator 16 comprises a shape memory material.

10 Claims, 14 Drawing Sheets

U.S. PATENT DOCUMENTS

Figure 1:
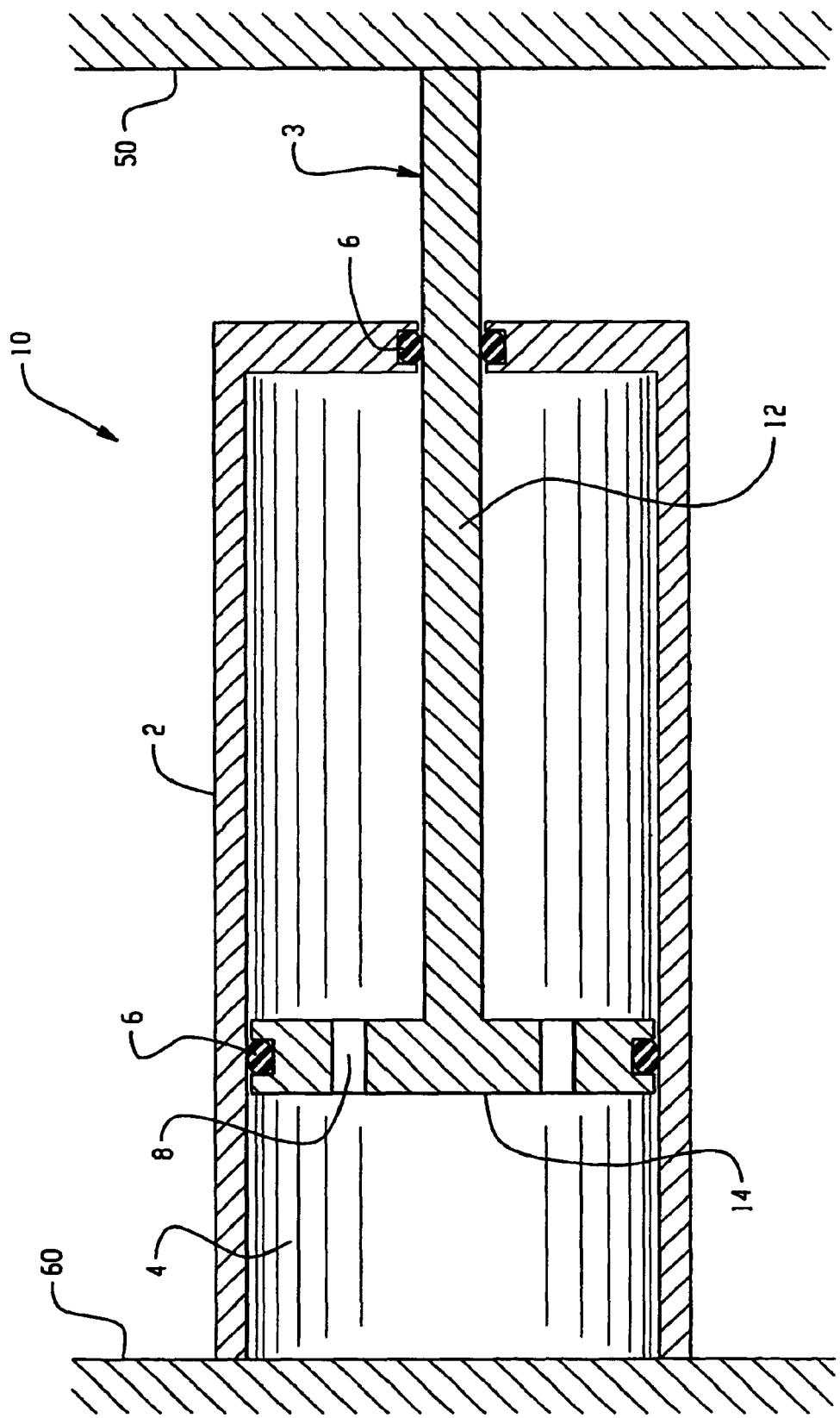

| | | | |
|---|---|---|---|
| 5,967,268 A * | 10/1999 | de Molina et al. | 188/277 |
| 6,008,992 A | 12/1999 | Kawakami | 361/726 |
| 6,126,371 A * | 10/2000 | McCloskey | 411/82.5 |
| 6,371,463 B1 | 4/2002 | Sorovshian | 267/158 |
| 6,382,602 B1 | 5/2002 | Morrow | 267/64.23 |
| 6,384,518 B1 | 5/2002 | van Poppel | |
| 6,427,813 B1 | 8/2002 | Carlson | 188/267.2 |
| 6,491,291 B1 * | 12/2002 | Keeney et al. | 267/190 |
| 6,508,437 B1 * | 1/2003 | Davis et al. | 244/173.2 |
| 6,615,449 B1 | 9/2003 | Alvarez | 16/66 |
| 6,715,591 B2 * | 4/2004 | Davis | 188/268 |
| 6,832,539 B2 | 12/2004 | Colby | 92/14 |
| 6,848,727 B1 | 2/2005 | Cetnar et al. | 292/201 |
| 6,871,519 B2 | 3/2005 | Butera et al. | 70/256 |
| 6,886,837 B2 | 5/2005 | Gibbs | 280/43.17 |
| 6,920,966 B2 * | 7/2005 | Buchele et al. | 188/300 |
| 7,029,044 B2 * | 4/2006 | Browne et al. | 293/137 |
| 7,111,359 B1 | 9/2006 | Luca | 16/66 |
| 2002/0074742 A1 | 6/2002 | Quoiani | 277/627 |
| 2002/0185347 A1 | 12/2002 | Pohl et al. | 188/267.1 |
| 2004/0194970 A1 | 10/2004 | Eatwell et al. | 166/387 |
| 2004/0231933 A1 * | 11/2004 | Buchele et al. | 188/267 |
| 2005/0072579 A1 | 4/2005 | Gambier | 166/387 |
| 2005/0199455 A1 * | 9/2005 | Browne et al. | 188/266.4 |
| 2005/0205364 A1 | 9/2005 | Browne et al. | 188/31 |
| 2005/0206095 A1 | 9/2005 | Keefe et al. | 277/628 |
| 2005/0206175 A1 | 9/2005 | Browne et al. | 292/253 |
| 2005/0230195 A1 | 10/2005 | Jones et al. | 188/68 |
| 2005/0263359 A1 | 12/2005 | Mankame et al. | 188/266.1 |

FOREIGN PATENT DOCUMENTS

| | | |
|---|---|---|
| JP | 63050678 A * | 3/1988 |
| JP | 01288646 A * | 11/1989 |
| WO | WO2004/001170 A1 | 12/2003 |

* cited by examiner

CUSTOMIZABLE STRUT ASSEMBLIES AND ARTICLES THAT EMPLOY THE SAME

CROSS-REFERENCE TO RELATED APPLICATIONS

This application claims the benefit of U.S. Provisional Application Ser. No. 60/552,791 filed Mar. 12, 2004, the entire contents of which are hereby incorporated by reference.

BACKGROUND

This disclosure relates to strut assemblies whose attributes can be customized depending upon external conditions and upon user preference.

Strut assemblies are often used in automobiles to facilitate the opening, locking and positioning of a suspended body (e.g., doors, trunks, hoods, tail-gates, or the like). These assemblies generally do not offer opportunities for fine control. In addition, these assemblies are often susceptible to temperature changes and their performance tends to vary with temperature and other environmental conditions. The strut assemblies that are commerically available have functional attributes that are fixed during design and/or manufacture. These functional attributes cannot be controlled by the consumer thereafter, but they can vary with wear and operating conditions. For example, the fluid used in a strut assembly may have a viscosity that is chosen to yield optimum performance in terms of the effort required to extend and retract the strut over a nominal range of temperatures. If however, the temperature drops below this nominal range, the viscosity increases, thereby increasing the effort required to operate the strut assembly.

It is therefore desirable to use strut assemblies that offer opportunities for fine control during opening and closing and which offer reproducible performance under a variety of different conditions.

SUMMARY

Disclosed herein is a strut assembly comprising a piston in slideable communication with the housing; an actuator in operative communication with the piston, wherein the actuator comprises a shape memory material and is adapted to control the displacement of the piston.

Disclosed herein too is a method of operating a strut assembly comprising displacing a suspended body in operative communication with a piston; and activating an actuator in operative communication with the piston, wherein the actuator comprises a shape memory material.

DETAILED DESCRIPTION OF FIGURES

Figure 2:
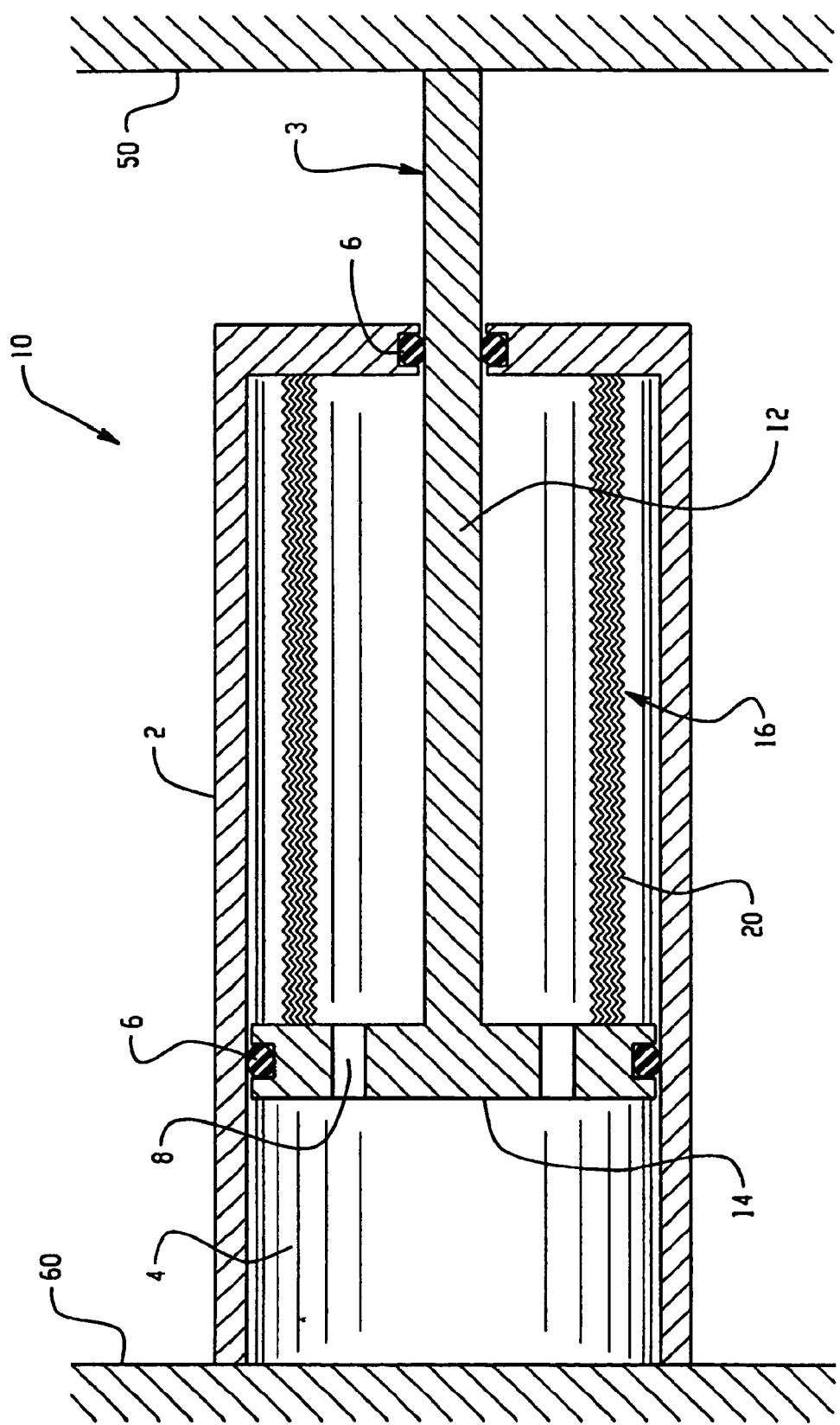
Figure 3:
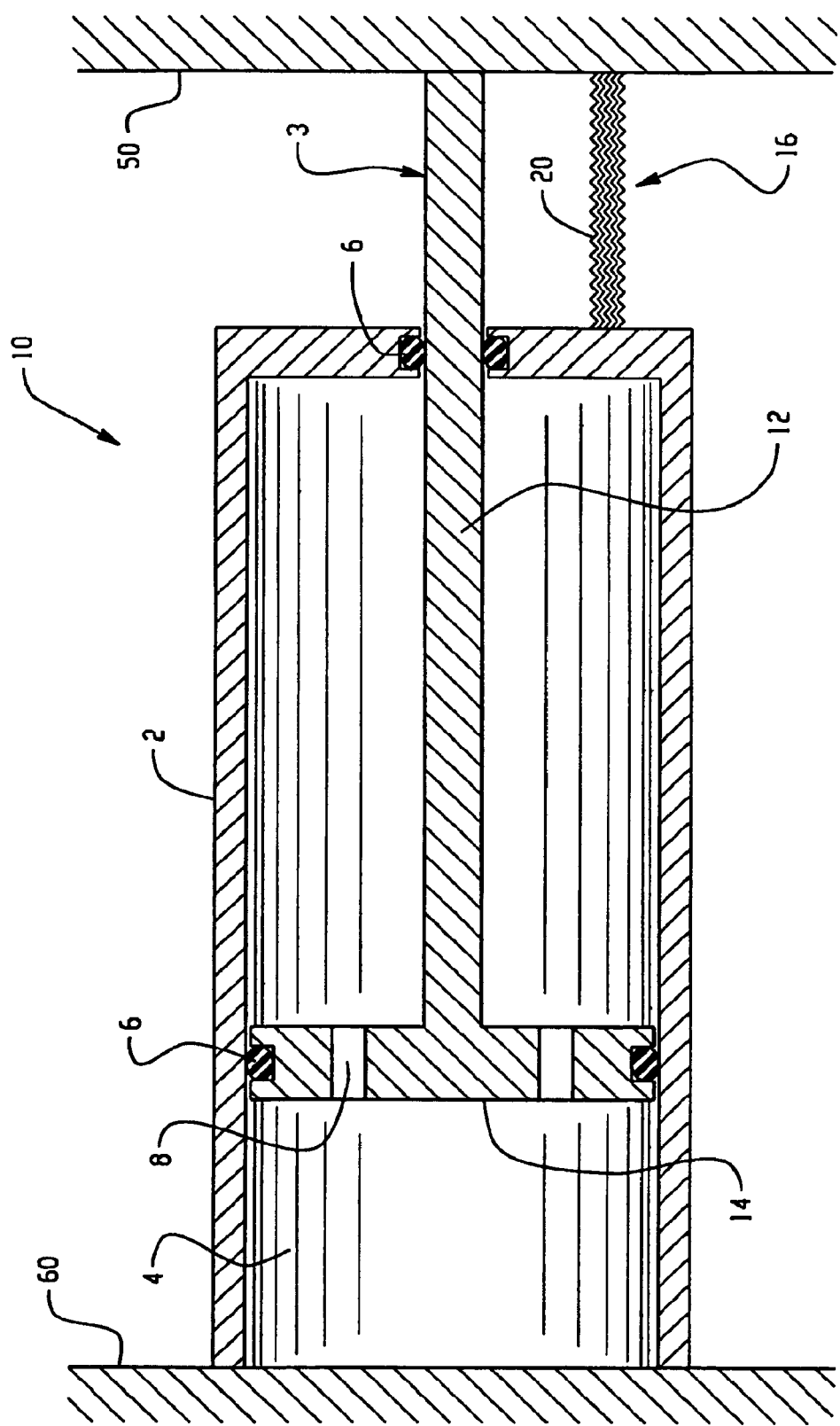
Figure 4:
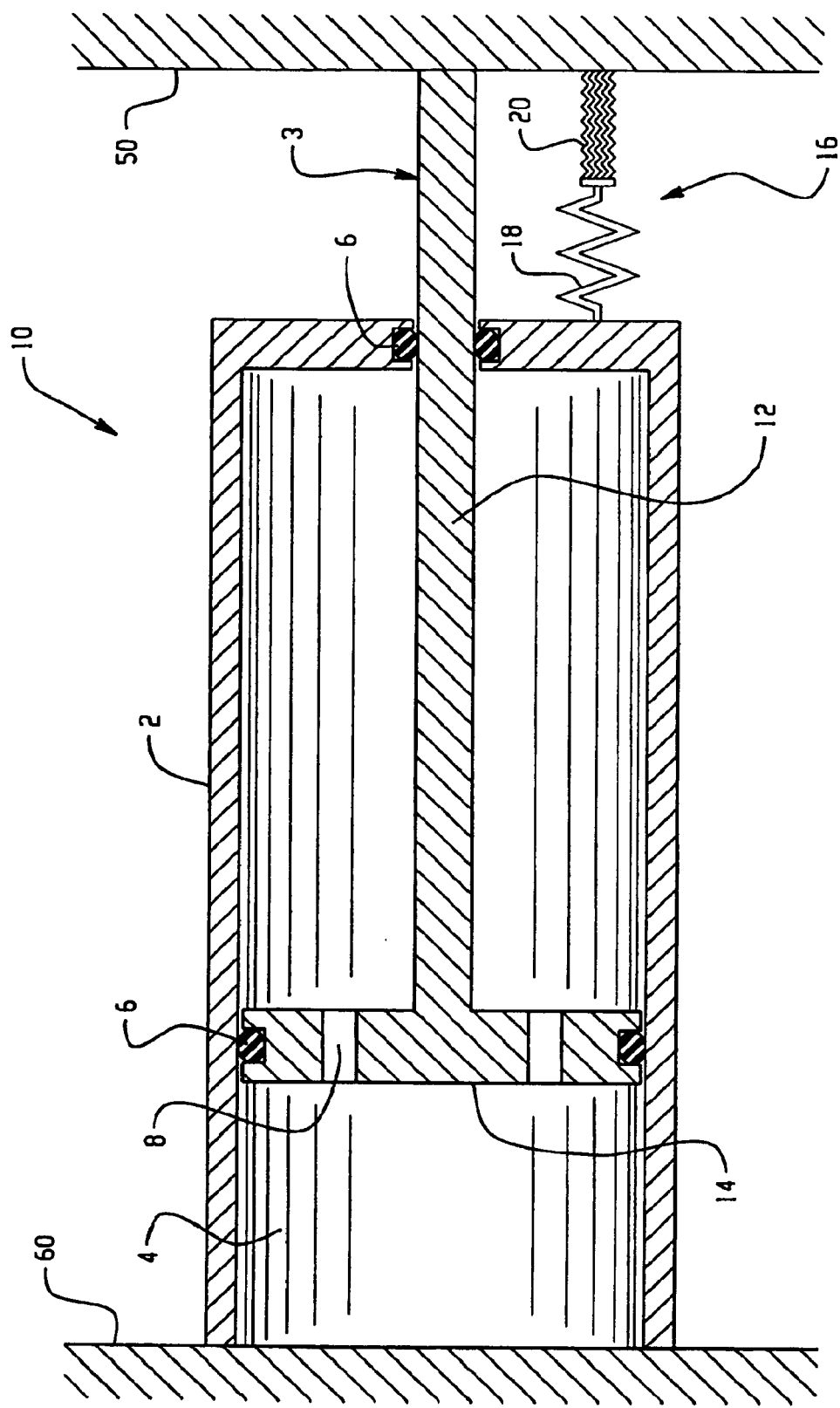
Figure 5:
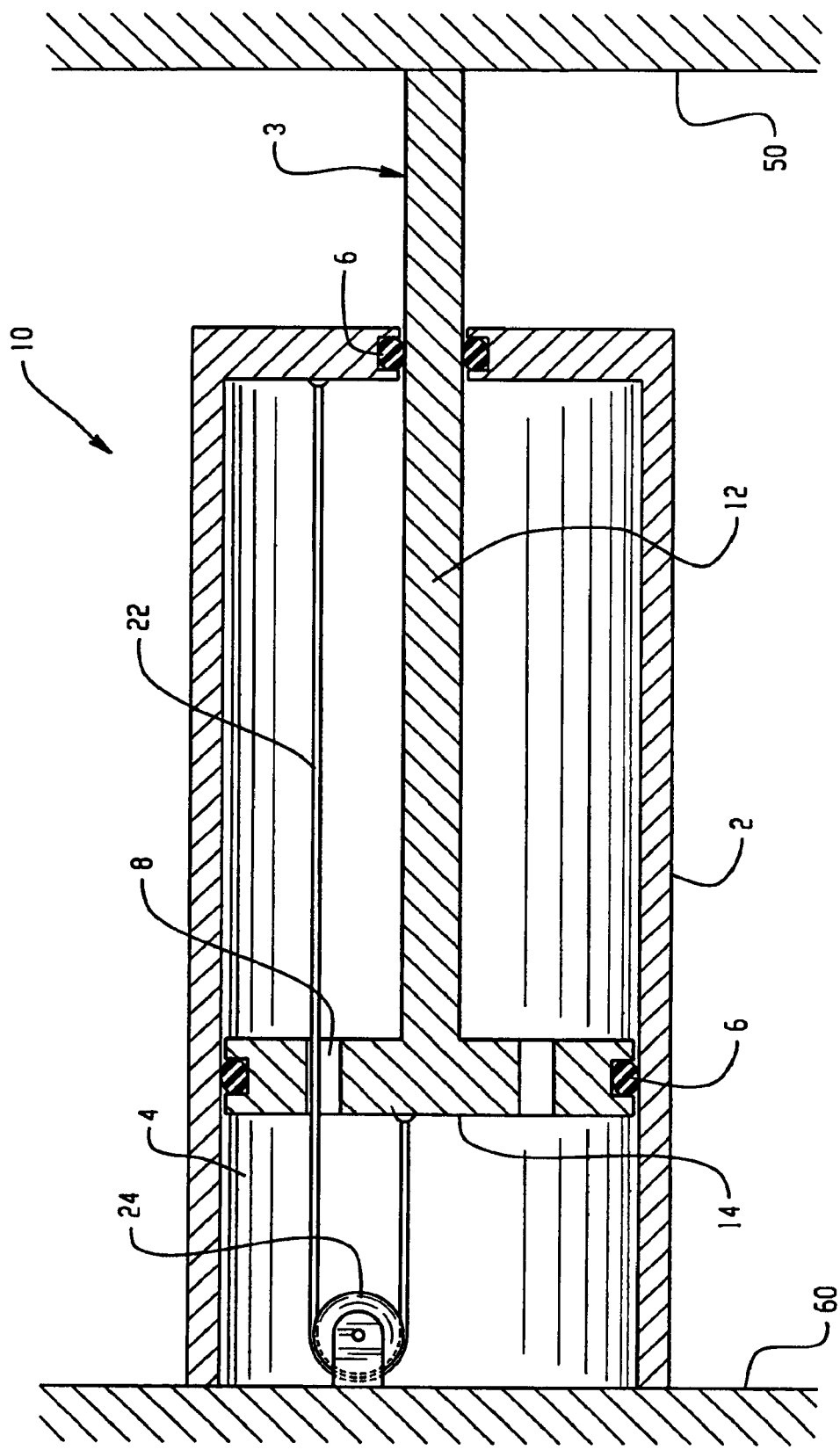
Figure 6:
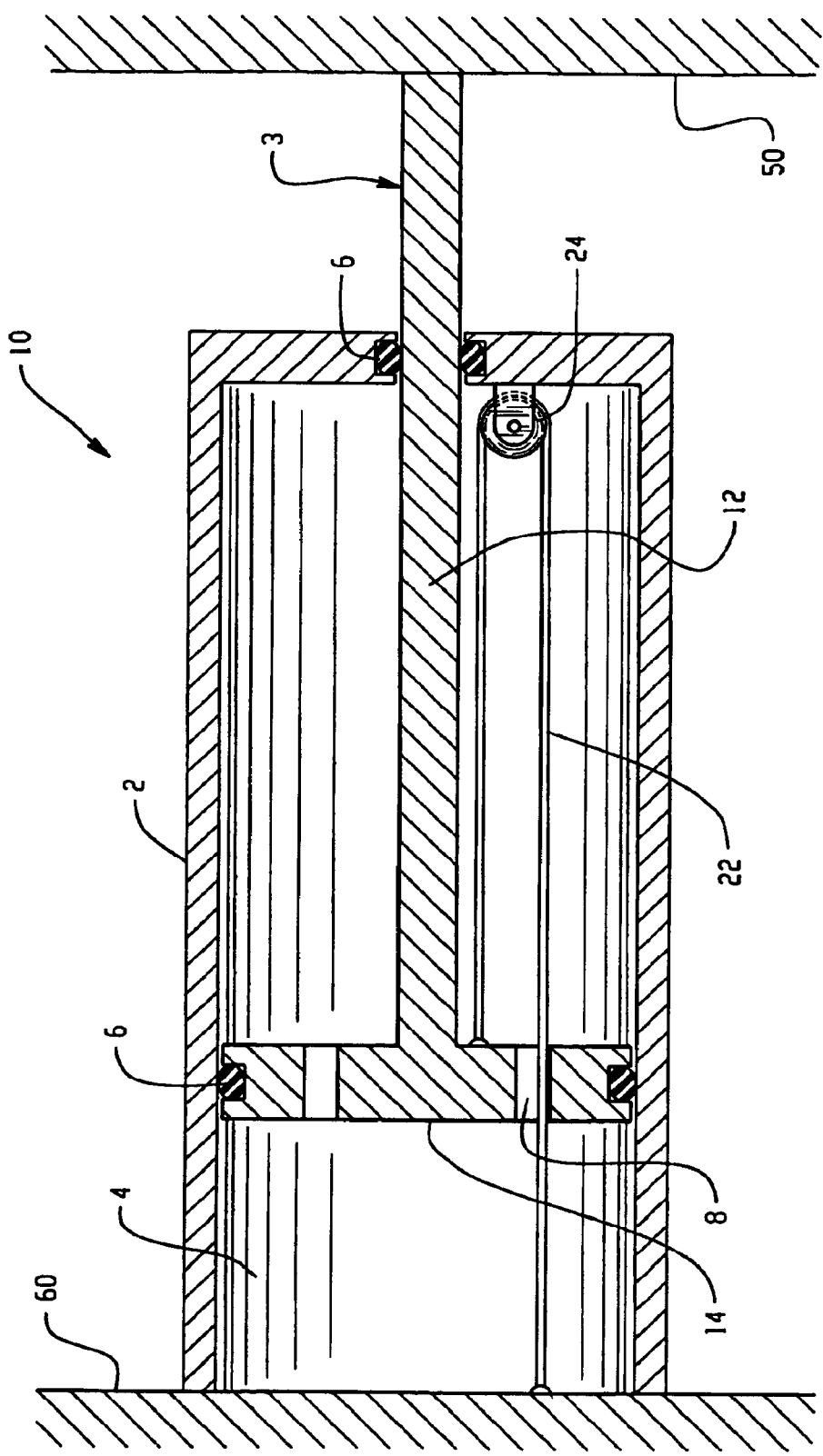
Figure 7:
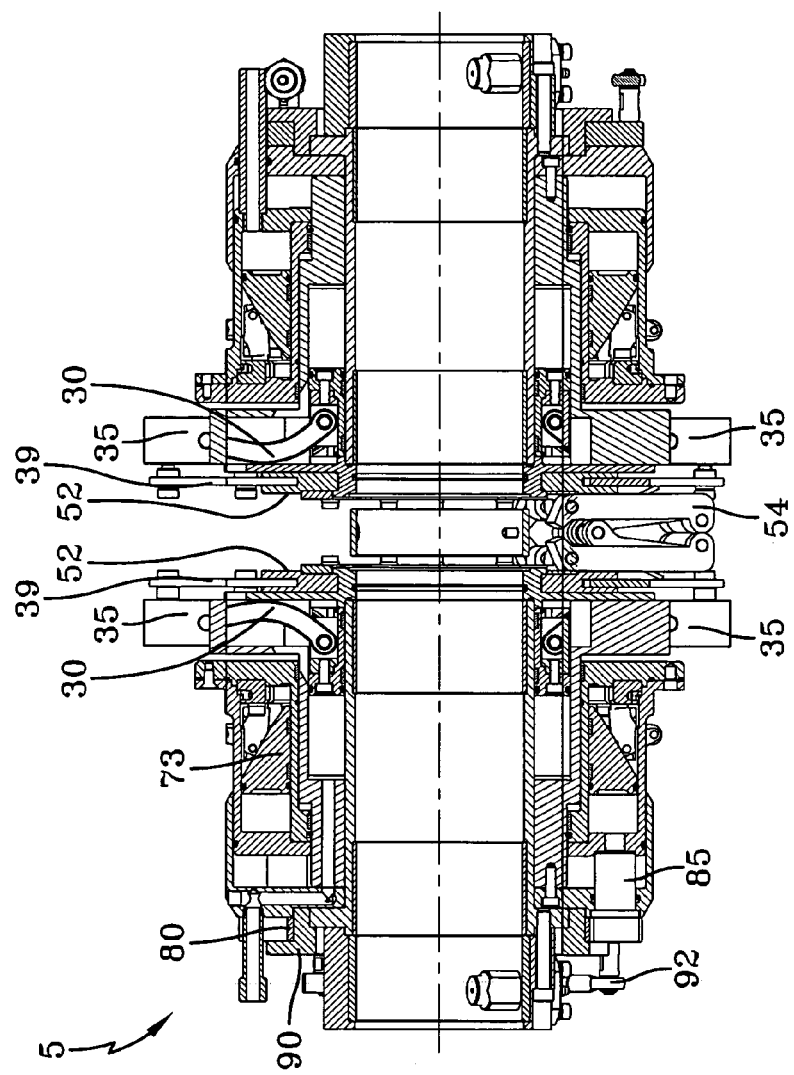
Figure 8:
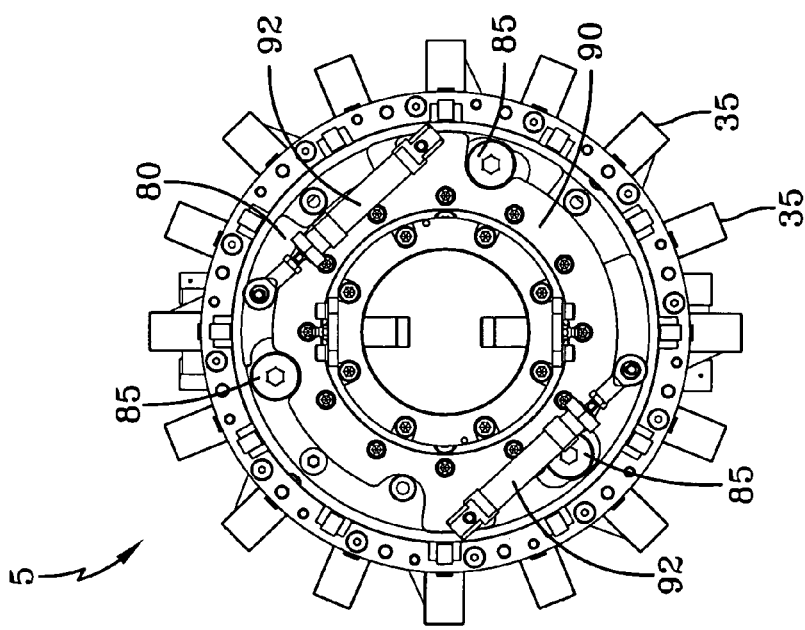
Figure 9:
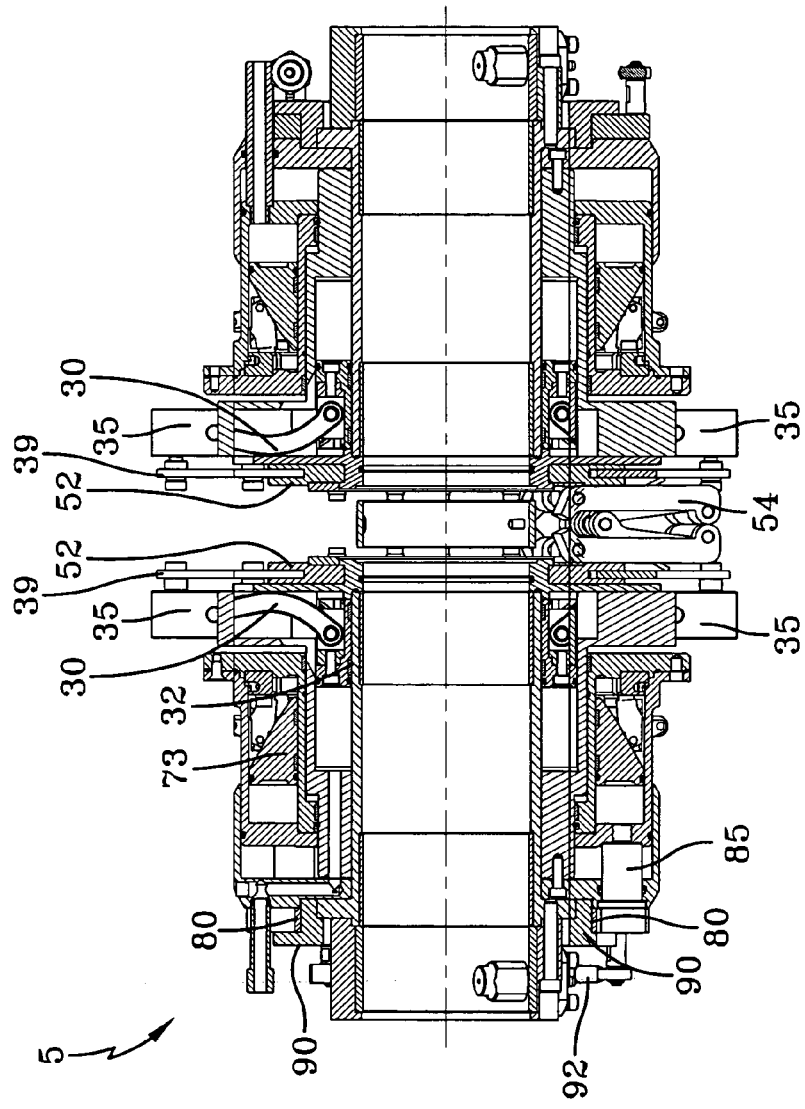
Figure 10:
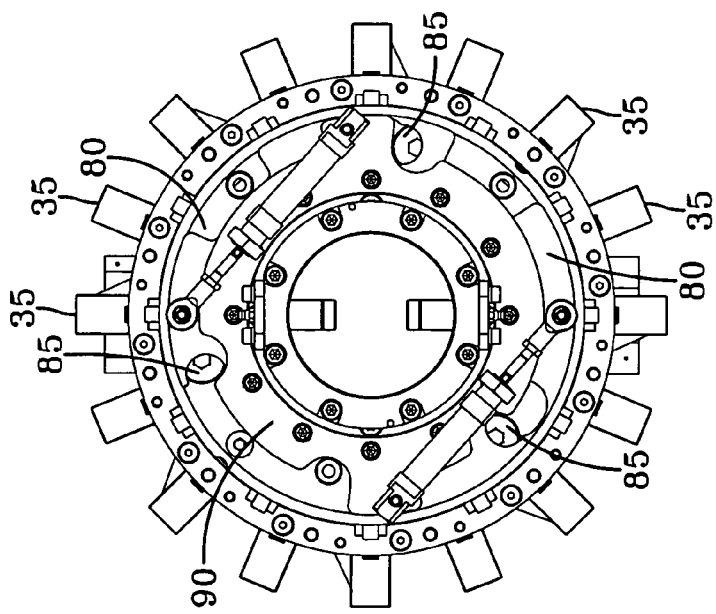
Figure 11:
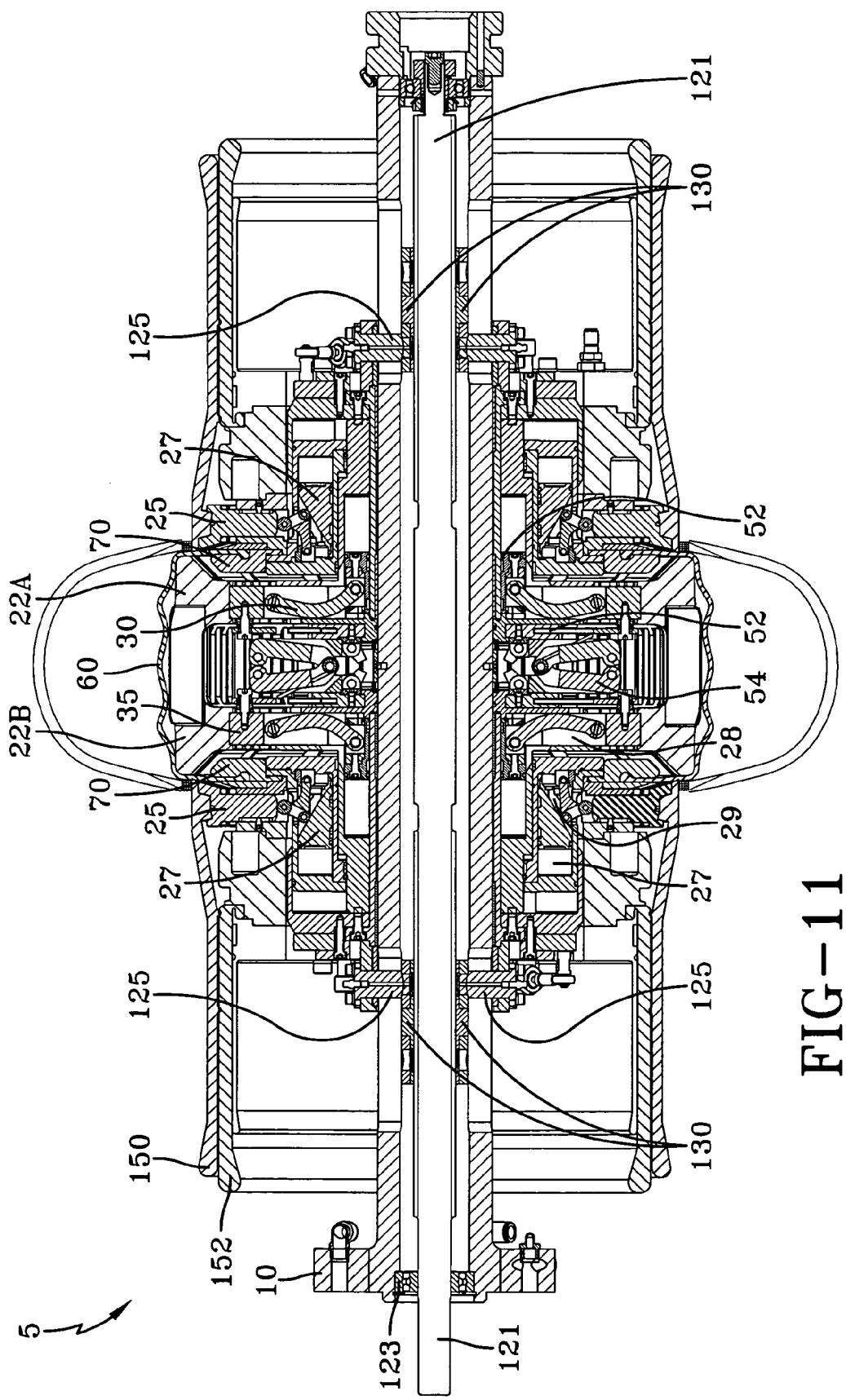
Figure 12:
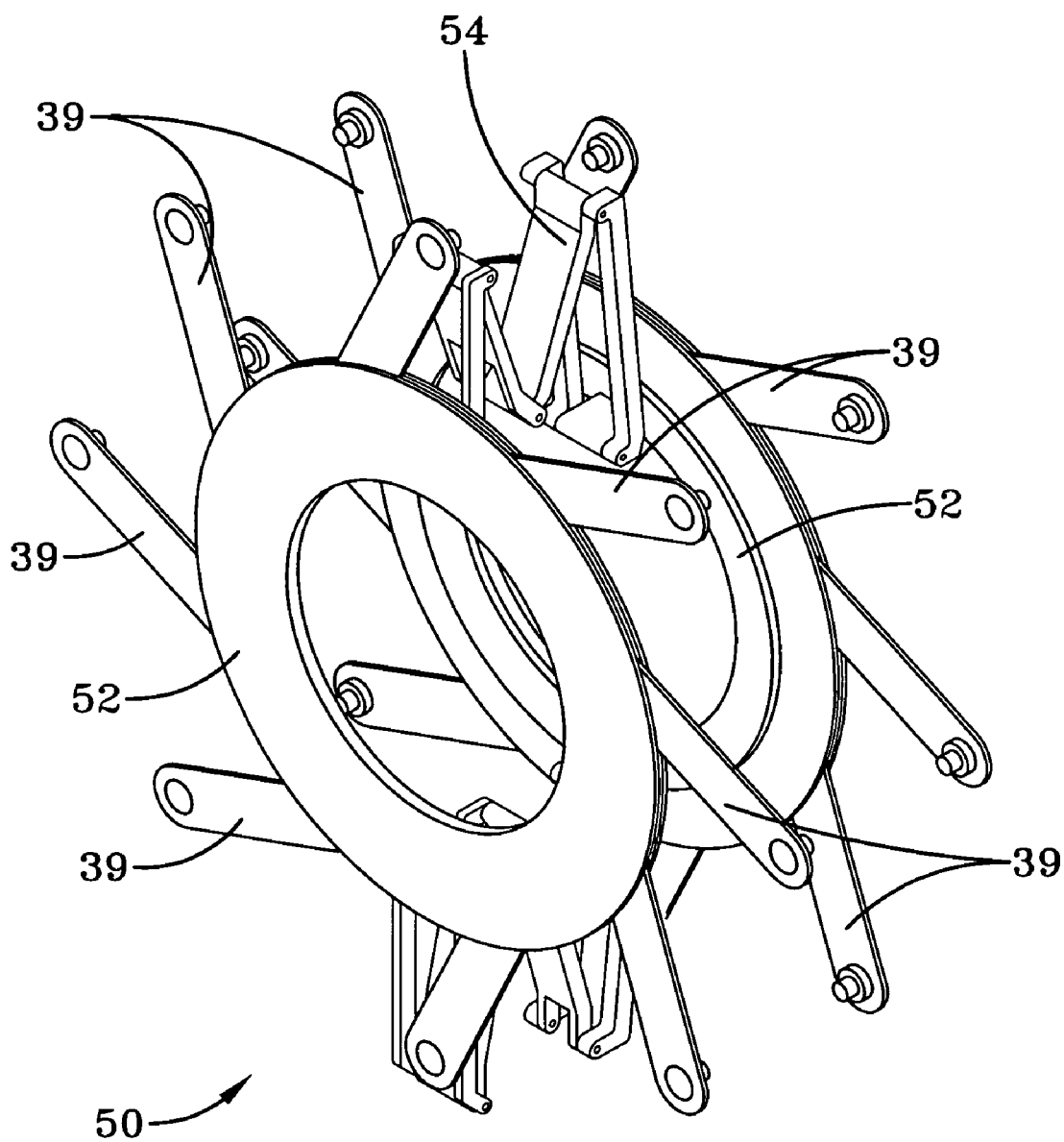
Figure 13B:
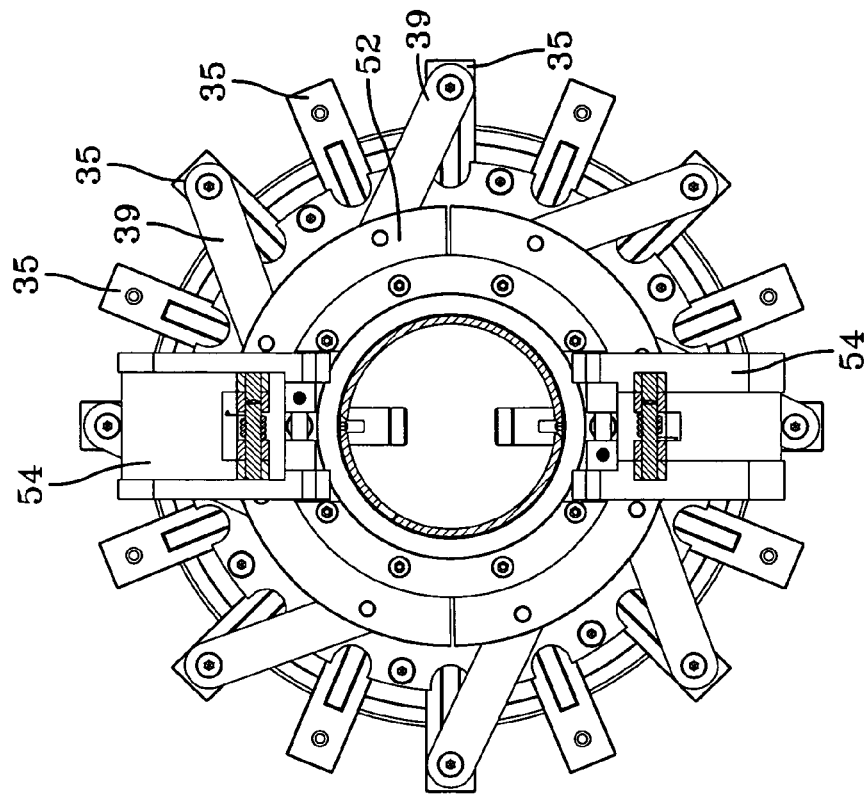
Figure 13A:
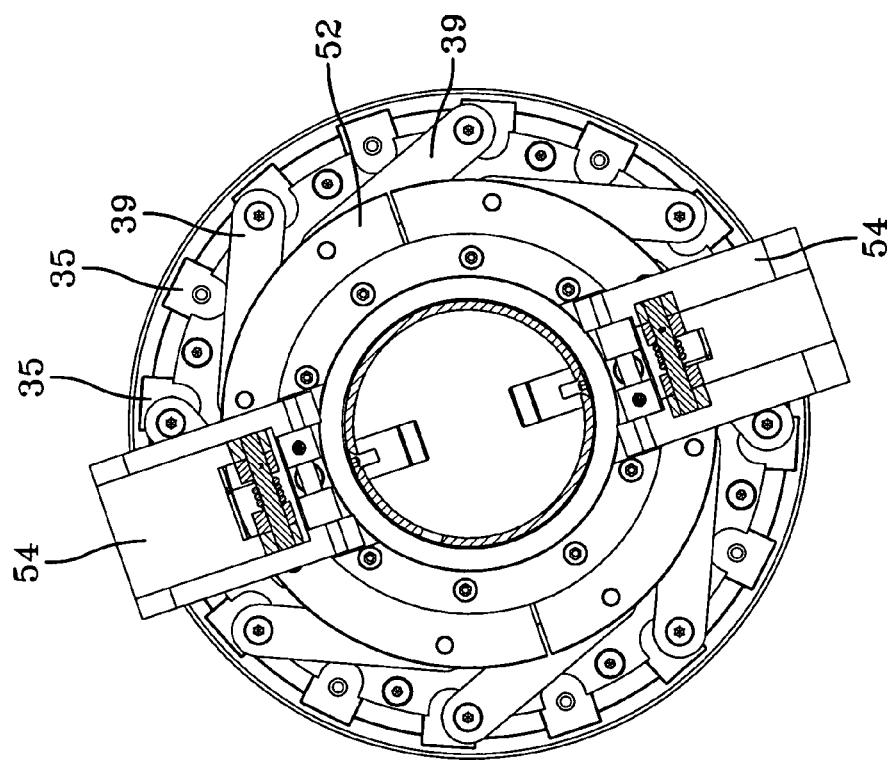
Figure 14A:
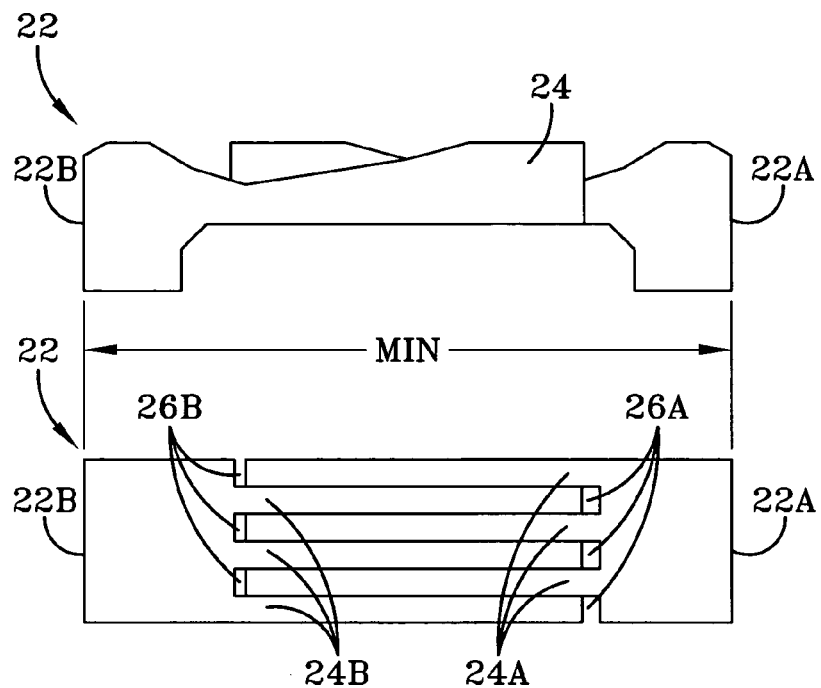
Figure 14B:
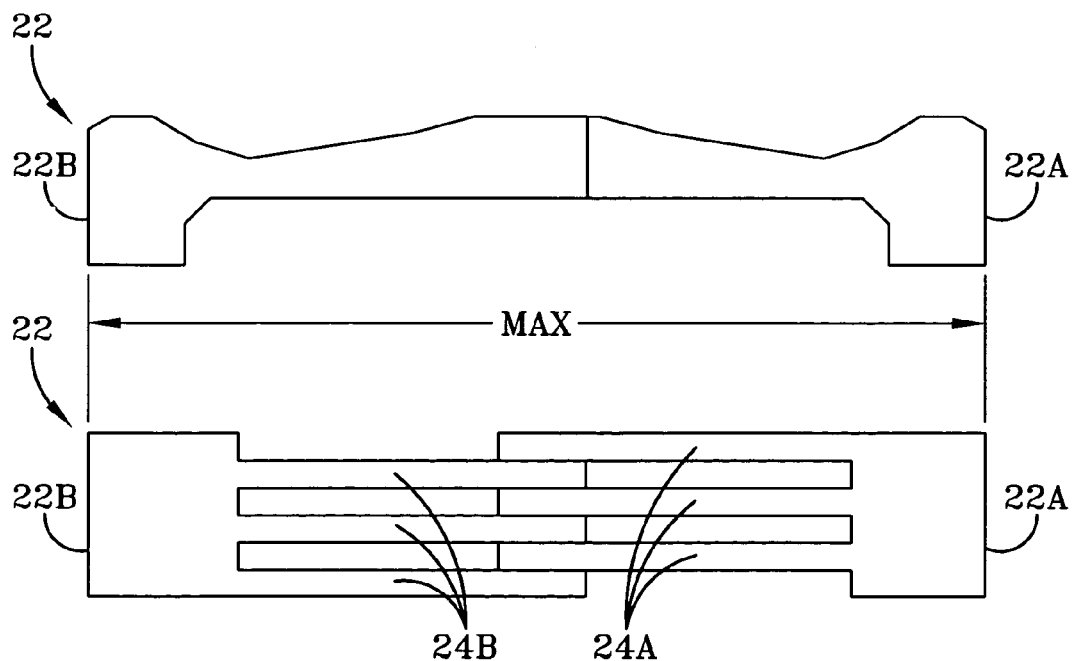
Figure 15:
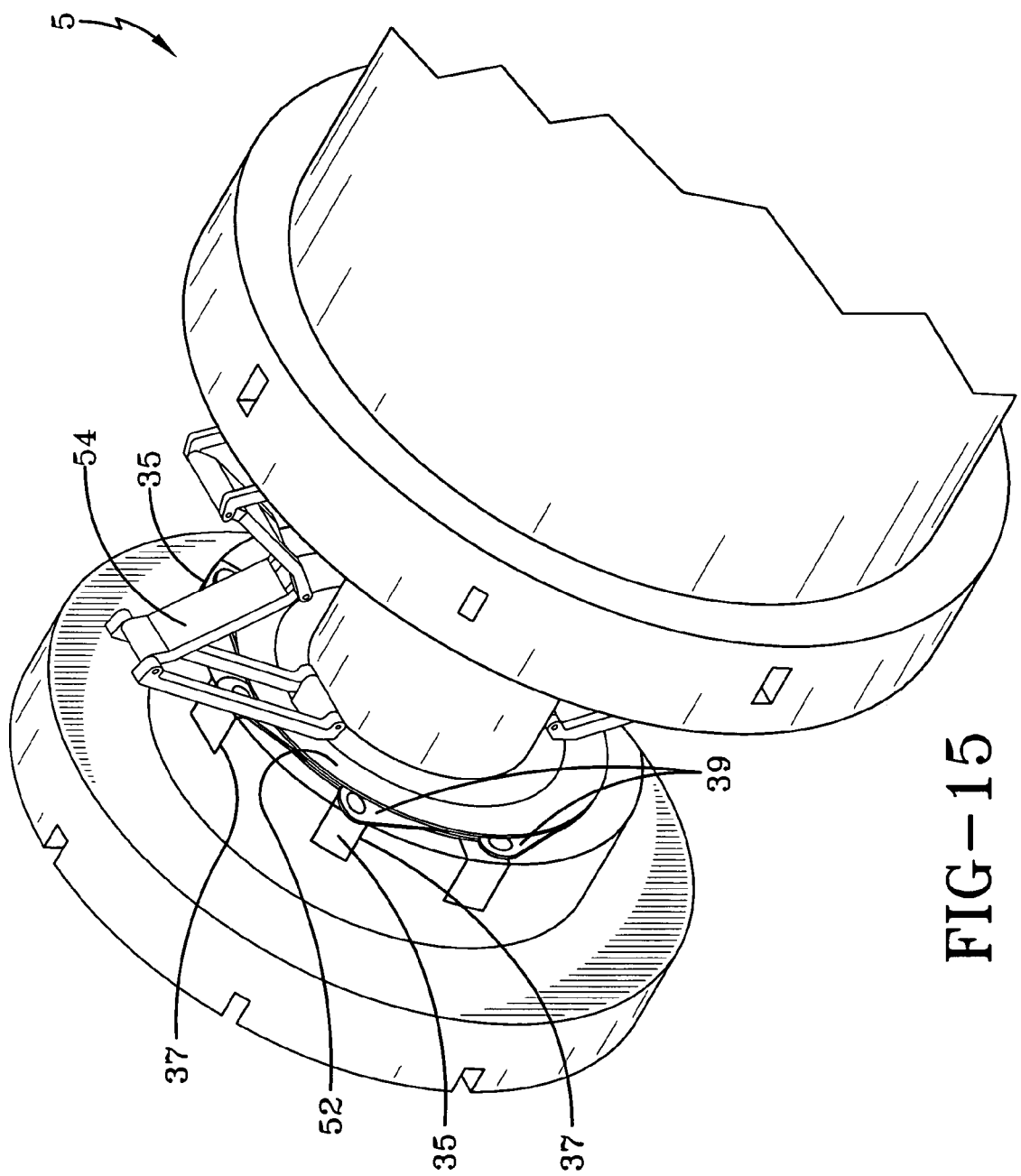
Figure 16:
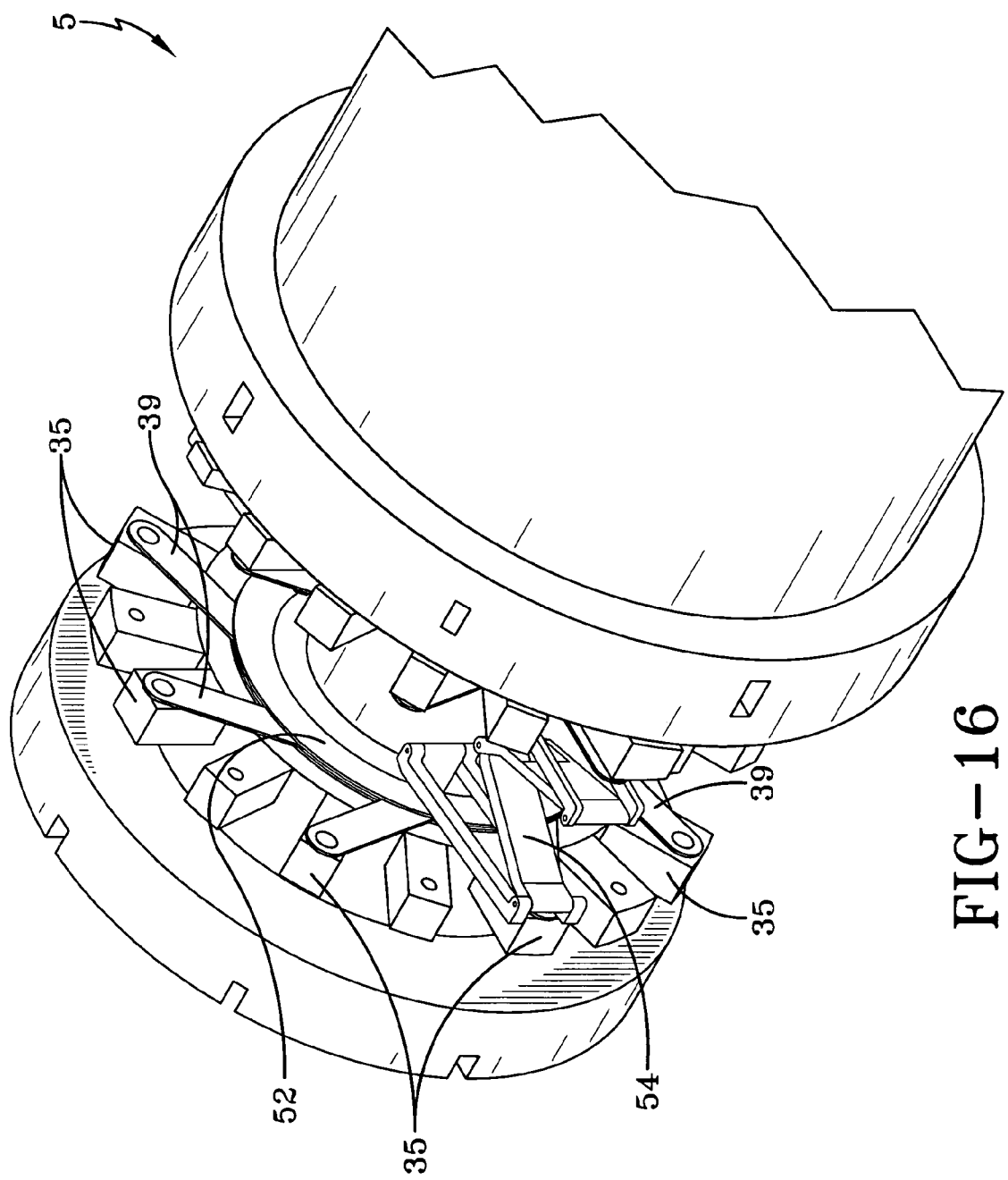

FIG. 1 is a schematic depiction of a prior art strut assembly 10 comprising a housing 2 that is in slideable communication with a piston head 14 and a piston rod 12;

FIG. 2 is a schematic representation of an exemplary embodiment of the improved customizable strut assembly 10 of this disclosure wherein the assembly 10 comprises an actuator 16 interposed between the piston head 14 and the housing 2;

FIG. 3 is a schematic representation of an exemplary embodiment of the improved customizable strut assembly 10 wherein the actuator 16 comprises an active element 20 is disposed external to the housing 2;

FIG. 4 is a schematic representation of an exemplary embodiment of the improved customizable strut assembly 10 wherein the actuator 16 comprises an active element 20 and an additional active element 18 both of which are disposed external to the housing 2;

FIG. 5 is a schematic representation of an exemplary embodiment of the improved customizable strut assembly 10 wherein a shape memory alloy wire 22 is wound around a single pulley 24 in a manner such that the activation of the wire assists in the displacement of the suspended body 60 towards the supporting body 50; and FIG. 6 is a schematic representation of an exemplary embodiment of the improved customizable strut assembly 10 wherein a shape memory alloy wire 22 is wound around a single pulley 24 in a manner such that the activation of the wire assists in the displacement of the suspended body 60 away from the supporting body 50.

DETAILED DESCRIPTION

Disclosed herein are strut assemblies whose geometry and/or functional attributes can be tailored to facilitate effective control over the effort required to operate articles that are in communication with the struts. The article may be any device that utilizes spatial positioning such as a door in an automobile or a residential building; the hood or trunk of a automobile; the jaws of a vice or a press; the platens on machine tools such as injection molding machines, compression molding machines; arbors and chucks on lathes and drilling machines, or the like. The effort utilized in opening or closing a desired article can be adjusted to suit the preferences of the consumer or to ensure consistent performance over a range of operating conditions by compensating for wear, changes in ambient temperature, or the like.

The customizable strut assemblies disclosed herein differ from those that are currently commercially available in that they comprise active materials that permit some functional attributes of the assemblies to be adjusted after manufacture. In one example, a car owner can adjust selected attributes of the customizable strut assembly to suit the local climatic conditions and/or his or her anthropometrics. In another example, a dealer can advantageously adjust selected attributes of the strut assembly at the point of sale to customize an otherwise mass produced vehicle to suit the desires of a specific buyer. In yet another example, a service center can adjust selected strut attributes to counteract the effects of wear. In an exemplary embodiment, these adjustments can be made either via hardware tuning or via software changes.

With reference to the FIG. 1, which represents the prior art, a strut assembly 10 comprises a housing 2 that is in slideable communication with a piston 3. The piston 3 comprises a piston head 14 and a piston rod 12. The piston head 14 is fixedly attached to the piston rod 12. The housing 2 contains a fluid 4. The fluid 4 may optionally be heterogeneous e.g. compressed $N_2$ gas fills the bulk of the housing but oil filled pouches are disposed at the ends of the housing to provide end-of-stroke damping. The piston head 14 has disposed in it channels 8 that permit the passage of fluid as the piston head 14 moves in the housing 2. Seals 6 are circumferentially disposed upon the piston head 14 and seal the space between the piston head 14 and the cylinder 2. Seals 6 can also be optionally disposed between the piston rod 12 and the housing 2. The strut assembly 10 is in mechanical communication with a supporting body 50 (e.g., the body of the vehicle) and is also in operative communication with a suspended body 60 (e.g., a panel that swings back and forth such as a door). The supporting body 50 and the suspended body 60 are disposed at opposing ends of the strut assembly 10.

As the piston rod 12 slides back and forth in the housing 2 during the expansion or contraction of the strut assembly, the fluid 4 is forced to flow through the channels 8 in the piston head 14. This flow is restricted by the channels 8 and the restricted flow gives rise to two forces that resist relative motion between the piston and the cylinder, an elastic force arising out of the compression of the fluid column that the piston head is pushing against, and a hydrodynamic force arising from the resistance to fluid flow through the channels 8 in the piston head 14. Friction brought on by the presence of the seal 6 between the piston head 14 and the inner wall of the housing 2, or between the piston rod 12 and the housing 2, also resists relative motion between the piston head and the cylinder.

In general, in order to operate the strut assembly 10, it is desirable to apply an external force that exceeds the sum of these resisting forces and any other external loads supported by the strut members (e.g., the weight of the supported body, restoring force exerted by a spring that functions to keep the swing panel open, or the like). This force generally has to be applied manually and the amount of force that is applied varies with environmental conditions, wear on the strut, or the like. In addition, the force to be applied along the length of the strut assembly may vary significantly from the initiation of the displacement of the suspended body 60 to completion of the displacement due to the kinematics or kinetics of the motion.

As the geometries of the different elements of the strut assembly displayed in the FIG. 1 are fixed at the time of manufacture of the strut assembly 10, the only variations in performance can come from changes in the geometry and/or material properties of the elements due to wear and/or changes in operating conditions, e.g., leakage of fluid causes the struts to lose about 10 to about 20% of their force over 10 years. These change-inducing influences are usually detrimental to the performance of the strut assembly 10 and cannot be counteracted without significant repair effort.

With reference now to the FIG. 2, which represents an embodiment of the customizable strut assembly 10 of this disclosure, the assembly 10 comprises an actuator 16 interposed between the piston head 14 and the housing 2. In one exemplary embodiment depicted in the FIG. 2, the actuator 16 is in operative communication with the housing 2 and the piston head 14.

The housing 2 can have any desired geometry. For example, the housing can have a circular, square, rectangular, or a polygonal cross-section. The actuator 16 comprises one or more active elements 20 that exert a force in a direction parallel to the direction of travel of the piston rod 12. In one embodiment, the force exerted by the actuator 16 may assist the displacement of the suspended body 60 away from the supporting body 50. In another embodiment, the force exerted by the actuator 16 may assist the displacement of the suspended body 60 towards the supporting body 50. In yet another embodiment, the force exerted by the actuator 16 may assist the displacement of the suspended body 60 towards the supporting body 50 as well as away from the supporting body 50 depending on the stimulus applied to the actuator.

In one embodiment, the actuator 16 generally comprises an active element 20 that comprises an active material. An active material generally refers to a group of materials that demonstrate an ability to return to some previously defined shape or size when subjected to an appropriate external stimulus. The active material, upon activation provides effort to the user by assisting or resisting the displacement of the suspended body 60 and thereby permitting control over the displacement. In another embodiment, the actuator 16 can also optionally comprise a passive material i.e., one that does not display shape memory properties and hence does not need an external source of energy to assist or resist the displacement of the suspended body 60. A suitable example of such a material is one that undergoes an increase in elastic modulus with an increase in temperature. In one method of using a passive material as the actuator 16, as the viscosity of the fluid 4 decreases with an increase in the ambient temperature, the resistance provided by the actuator 16 increases, thereby offsetting the reduced force that would have to be used to displace the suspended body 60 if the actuator 16 was absent.

In one embodiment, the actuator 16 provides a variable amount of assistance to the user such that the displacement of the suspended body 60 is uniform throughout the length of the stroke of the customizable strut assembly 10. In another embodiment, the actuator 16 provides a variable amount of assistance to the user such that the user effort required to produce the displacement of the suspended body 60 does not vary significantly across a range of ambient temperatures and environmental conditions.

In general, the maximum assistance is provided when it is most difficult to perform the displacement, such as, for example, at the low end of the operating temperature range, where the fluid viscosity is highest and the user can exert lesser force to open the suspended body 60. The assistance level is reduced as the temperature increases. In a similar manner, maximum resistance may be provided when the displacement of the suspended body 60 is the easiest for the user, such as, for example, at the high end of the operating temperature range. In one embodiment, the resistance provided by the actuator 16 can be varied proportionally between the upper and lower ends of the operating temperature range for the strut assembly 10.

The assistance/resistance level may be based on considerations of ease of use (i.e., ergonomics), maintaining consistency of performance by compensating for the effect of variations in the operating conditions (e.g., temperature, wear, or the like) and combinations thereof.

FIGS. 3 and 4 are exemplary embodiments of customizable strut assemblies 10 that utilize actuators 16 that are disposed externally. In the FIG. 3, the actuator 16 comprising the active element 20 is disposed external to the housing 2. The actuator 16 in the FIG. 3 functions in a similar manner to the actuator of FIG. 2. In the FIG. 4, the actuator 16 comprises an additional element 18 in addition to an active element 20. The additional element 18 can facilitate the return of the customizable strut assembly 10 to its default position. The additional element 18 can comprise either an active material or a passive material. In all of the exemplary embodiments depicted in the FIGS. 2, 3 and 4, when the customizable strut assembly 10 is expanded or contracted, a part of the externally applied force is used to extend or compress the active element 20. Thus by adjusting the stiffness of the active element 20, the external force used to displace the suspended body 60 can also be made adjustable. In other words, by using an active element 20 having a stiffness that is dependent upon conditions such as the ambient temperature, the wear geometry, or the like, a variable external force can be applied to displace the suspended body 60.

The actuator 16 can comprise one or more of active elements 20. Some of the active elements can comprise an active material, while others can comprise a passive material. The active elements 20 can be connected in series or parallel and can be disposed inside the housing 2 or outside the housing 2. In one embodiment, some of the active elements 20 can be disposed inside the housing 20, while others can be disposed outside the housing 20. The number of active elements 20 and the location of the active elements can be varied to suit the application.

In one embodiment, the actuator 16 can be activated by the manual application of an external stimulus during a manual displacement of the suspended body 60. In this embodiment, a user activates a separate switch or lever during the displacement of the suspended body 60 to assist or resist in its displacement. In another embodiment, the manual displacement of the suspended body 60 automatically facilitates the application of an external stimulus that actuates the actuator 16. In one such arrangement, the suspended body 60 is configured to electrically communicate with a programmable device having control logic that measures the displacement forces and supplies a proportional external stimulus to the actuator 16, thereby assisting or resisting in the manual displacement. Arrangements that rely on contact, proximity, or other sensors to activate the actuators can also be used.

As stated above, the active element 20 of the actuator 16 can comprise an active material. Active materials or shape memory materials generally refer to materials or compositions that have the ability to remember their original shape, which can subsequently be recalled by applying an external stimulus, i.e., an activation signal. Exemplary shape memory materials suitable for use in the present disclosure include shape memory alloys and ferromagnetic shape memory alloys and composites of the foregoing shape memory materials with non-shape memory materials, and combinations comprising at least one of the foregoing shape memory materials. In another embodiment, the class of active materials used in the customizable strut assembly 10 are those that change their shape in proportion to the strength of the applied field but then return to their original shape upon the discontinuation of the field. Exemplary active materials in this category are shape memory alloys, electroactive polymers (dielectric polymers), piezoelectrics, and piezoceramics.

For convenience and by way of example, reference herein will be made to shape memory alloys. An exemplary active material is a shape memory alloy. Shape memory alloys (SMA's) generally refer to a group of metallic materials that in a strained state demonstrate the tendency to return to some previously defined state or size when subjected to an appropriate thermal stimulus. Shape memory alloys are capable of undergoing phase transitions in which their flexural modulus (stiffness), yield strength, and shape orientation are altered as a function of temperature. Generally, in the low temperature, or martensite phase, shape memory alloys can be plastically deformed and upon exposure to temperatures greater than a characteristic transformation temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating.

Intrinsic and extrinsic two-way shape memory alloys are characterized by a shape transition both upon heating from the martensite phase to the austenite phase, as well as an additional shape transition upon cooling from the austenite phase back to the martensite phase. Active elements that exhibit an intrinsic one-way shape memory effect are fabricated from a shape memory alloy composition that will cause the active elements to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active connector elements that exhibit the extrinsic two-way shape memory effects are composite or multi-component materials that combine a shape memory alloy composition that exhibits a one-way effect with another element that provides a restoring force to return the first plate another position or to its original position.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a few degrees depending on the alloy composition.

Suitable shape memory alloy materials for fabricating the active elements include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, or the like, or a combination comprising at least one of the foregoing shape memory alloys. The alloys can be binary, ternary, or any higher order so long as the alloy composition exhibits a shape memory effect, e.g., change in shape orientation, changes in yield strength, and/or flexural modulus properties, damping capacity, and the like.

The thermal activation signal may be applied to the shape memory alloy in various ways. It is generally desirable for the thermal activation signal to promote a change in the temperature of the shape memory alloy to a temperature greater than or equal to its austenitic transition temperature. Suitable examples of such thermal activation signals that can promote a change in temperature are the use of steam, hot oil, resistive electrical heating, or the like, or a combination comprising at least one of the foregoing signals. A preferred thermal activation signal is one derived from resistive electrical heating.

The active element 20 may also be an electroactive polymer (EAP). Di-electric elastomers (DE) are a class of electroactive polymers that are also suitable as actuators in the customizable strut assembly 10. The key design feature of devices based on these materials is the use of compliant electrodes that enable polymer films to expand or contract in the in-plane directions in response to applied electric fields or mechanical stresses. When electroactive polymers are used as the active element 20, strains of greater than or equal to about 100%, pressures greater than or equal to about 50 kilograms/ square centimeter (kg/cm$^2$) can be developed in response to an applied voltage. The good electromechanical response of these materials, as well as other characteristics such as good environmental tolerance and long-term durability, make them suitable for active elements under a variety of manufacturing conditions. Electroactive polymers are suitable for use as an active element in many customizable strut assembly 10 configurations.

Electroactive polymer coatings used in customizable strut assembly 10 may be selected based on one or more material properties such as a high electrical breakdown strength, a low modulus of elasticity-(for large deformations), a high dielectric constant, and the like. In one embodiment, an electroactive polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an intrinsically conductive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The electroactive polymers used herein, are generally conjugated polymers. Suitable examples of electroactive polymers are poly(aniline), substituted poly(aniline)s, polycarbazoles, substituted polycarbazoles, polyindoles, poly(pyrrole)s, substituted poly(pyrrole)s, poly(thiophene)s, substituted poly(thiophene)s, poly(acetylene)s, poly(ethylene dioxythiophene)s, poly(ethylenedioxypyrrole)s, poly(p-phenylene vinylene)s, or the like, or combinations comprising at least one of the foregoing electroactive polymers. Blends or copolymers or composites of the foregoing electroactive polymers may also be used. Similarly blends or copolymers or composites of an electroactive polymer with an electroactive polymer precursor may also be used.

In one embodiment, the active materials detailed above may be used as actuating elements in motors such as electric stepper motors, inchworms, piezoelectric inchworms, ultrasonic motors, electrohydrostatic actuators, nanomotion piezoelectric motors, compact hybrid actuator devices, that may be employed in the actuator 16. These motors can be used in the customizable strut assemblies 10 external to the housing 2 as depicted in the FIGS. 3 and 4.

In one exemplary embodiment, in one method of operating the customizable strut assemblies depicted in the FIGS. 2, 3 and/or 4, the active element 20 is a spring made from a shape memory alloy. The stiffness of this spring can be varied by changing the elastic modulus of its material even if its geometry (e.g., coil diameter, wire diameter, number of turns, etc.) is fixed. As noted above, shape memory materials can exist in two different phases, a martensitic phase, which is the softer phase that is stable at lower temperatures, and the austenitic phase, which is stable at higher temperatures and has an elastic modulus that is greater than that of the martensitic phase by a factor of about 2 to about 3. A solid-state transformation between these phases can be induced by heating and/or cooling the material. The transition between the two phases can be sharp or gradual depending on the composition of the shape memory alloy. If the transition is sharp, the material is either austenitic and stiff, or martensitic and soft. Thus, if the shape memory alloy spring is made from a material with a sharp phase transition, the spring is either stiff or soft depending on its temperature. However, if the phase transition is gradual, there exists a range of intermediate temperatures that correspond to mixtures of varying proportions of the two phases. In this case, the stiffness of the shape memory alloy spring is infinitely variable between the limits imposed by the fully austenitic and fully martensitic conditions.

The spring material is chosen such that it is martensitic and soft over the range of normal working temperatures i.e., the range of operation of customizable strut assembly 10. Passage of an electric current through the shape memory alloy can heat it resistively to induce a martensitic to austenitic phase transformation, which leads to a sharp increase in stiffness of the spring. If the spring is strained when the transformation is effected, the spring tries to recover its unstrained configuration. This may involve a change in shape and/or size of the spring, and it can exert a large force if the recovery is resisted.

If the unstrained configuration of the spring is chosen to correspond to the suspended body 60 being in the open position (assuming the suspended body to be a door), either fully or partially, then a martensitic to austenitic transformation can be induced in the active element 20 to assist the process of opening the suspended body 60. The open position in this specific embodiment corresponds to the displacement of the suspended body 60 away from the supporting body 50. The magnitude of the assistance provided by the active element 20 during this displacement can be varied to achieve fine control over the opening effort.

In one embodiment, when the transformation of the shape memory alloy is characterized by a gradual transformation between the martensitic and austenitic phases, this control can be exercised by adjusting the actuation temperature to control the amount of assistance during the displacement. In another embodiment, when the transformation of the shape memory alloy is characterized by a sharp transformation between the martensitic and austenitic phases, the amount of assistance during the displacement can be varied by selectively actuating a fraction of the number of shape memory alloy springs connected in parallel to form the actuator. In yet another embodiment, the amount of assistance can be varied by using multiple parallel springs that are made of shape memory alloy materials having staggered transformation temperatures. In yet another embodiment, the amount of assistance can be varied by the use of a shape memory alloy that exhibits a two-way shape memory effect.

The electric current supplied to the shape memory alloy spring is switched off at a suitable point during the displacement of the suspended body 60 and the spring is allowed to cool down, which results in an austenitic to martensitic transformation in the spring material. This results in the spring being in its soft state or lower modulus state during the closing process or reverse displacement process, when an external force will be used to restore the spring to its initial configuration.

By varying the unstrained configuration of the spring and material composition, the active element 20 can be configured to assist in the process of closing the suspended body 60. This configuration can be advantageously used when it is desired to close the suspended body 60 against the resistive force of a seal, such as, for example, a door seal.

In another embodiment, another method of using an active material to assist in displacing a suspended body by using the customizable strut assembly 10 is depicted in FIGS. 5 and 6 respectively. FIGS. 5 and 6 depict exemplary embodiments that can be used to increase the fraction of the stroke length over which the user effort can exert control in the customizable strut assembly 10. In these embodiments, the actuator 16 comprises e.g. a shape memory alloy wire 22 wound around a pulley 24. A first end of the wire is fixedly attached to an inner surface of the housing 2, while the other end is fixedly attached to the piston head. The wire 22 travels through the channel 8 in the piston head. The length of the shape memory alloy wire 22 is greater than the length of travel of the strut. In one embodiment, additional pulleys may be used if desired. In another embodiment, additional wires may be used in conjunction with additional pulleys if desired.

Increasing the length of the wire allows control over a greater fraction of the stroke of the strut. For example, if a wire with an active free length of approximately 12.5 times the stroke of the strut and a maximum recoverable strain of about 8% is used, then the user effort can be effectively applied over the entire stroke of the strut. The embodiments shown in FIGS. 5 and 6 can also be combined to yield an active strut that can assist a user during both the opening and the closing (i.e., the forward and reverse displacement) of the suspended body 60 depending on which set of shape memory alloy wires were actuated.

With reference now to the FIG. 5, the shape memory alloy wire 22 is wound around a single pulley 24 in a manner such that the activation of the wire assists in the displacement of the suspended body 60 towards the supporting body 50. In another embodiment, depicted in the FIG. 6, the activation of the wire 22 results in the displacement of the suspended body away from the supporting body 50. Combining embodiments in FIGS. 5 and 6 can be used to obtain a customizable strut assembly that can provide the user with assistance during both the opening and closing of the suspended body. In the FIGS. 5 and 6, the wires are shown to pass through the channels 8 for the purposes of illustration, but it is understood that the wires can be arranged in other configurations.

The use of shape memory materials in the actuator 16 advantageously permits the actuator to provide variable assistance during the displacement of the piston and hence to the suspended body 60. The actuator 16 can advantageously provide assistance during a forward as well as during a reverse displacement of the suspended body 60. In other words, the actuator can provide assistance during a reversible displacement of the suspended body 60. In yet another embodiment, the assistance provided by the actuator 16 can be customized at any time during the life cycle of the strut assembly 10.

The customizable strut assemblies 10 disclosed above can be advantageously used to customize the force exerted by the user in opening doors on automobiles, aircraft, ships, or the like. The flexibility afforded by the customizable strut assemblies can be used by an owner to adjust the attributes of the strut to suit the local climatic conditions and/or his/her anthropometrics and/or ergonomic preferences; a dealer can adjust these attributes at the point of sale to customize an otherwise mass produced vehicle for a specific buyer and a service center can adjust the strut attributes to counteract the effects of wear.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A strut assembly having a customizable stroke length directly modified by active material actuation, comprising:
    a piston sealingly engaged with and in slideable communication with a housing, wherein the piston includes at least one channel for controlling fluid flow within the housing, and is fixedly attached to one of suspended and supporting bodies, and the housing is fixedly attached to the other of said suspended and supporting bodies; and
    an actuator drivenly coupled to the piston, comprising a plurality of active material elements operable to under a reversible change in fundamental property when exposed to or occluded from an activation signal, and defining a longitudinal axis, wherein the active material elements are fixedly connected to the piston and configured to oppositely exert first and second longitudinal forces directly upon the piston as a result of the change,
    said actuator being configured such that the change causes a relative displacement between the piston and housing, so as to permanently modify the stroke length,
    wherein the active material elements are disposed in parallel, each active material element comprises active material selected from the group consisting essentially of shape memory alloys, electroactive polymers, and the actuator provides mechanical advantage, so as to increase the force resulting from the activation of at least a portion of the active material elements.

2. The strut assembly of claim 1, wherein the actuator is configured to provide variable assistance during the displacement of the piston.

3. The strut assembly of claim 1, wherein the actuator is configured to provide variable assistance at any time during a life cycle of the strut assembly.

4. The strut assembly of claim 1, wherein the actuator is configured to effect uniform motion throughout a stroke length of the strut assembly.

5. The strut assembly of claim 1, wherein the actuator is configured to effect uniform motion across a range of ambient temperatures.

6. The strut assembly of claim 1, wherein the actuator is communicatively coupled to a programmable device having control logic.

7. The assembly as claimed in claim 1, wherein the active material elements include a linearly configured shape memory alloy wire.

8. The assembly as claimed in claim 7, wherein the wire passes through said at least one channel.

9. The assembly as claimed in claim 1, wherein the active material elementss are linearly configured shape memory alloy wires, the actuator further includes a pulley, and the wires engage the pulley.

10. The assembly as claimed in claim 1, wherein the active material elements are piezoelectric elements.

* * * * *